United States Patent [19]

Asay et al.

[11] Patent Number: 5,250,616
[45] Date of Patent: Oct. 5, 1993

[54] HIGH IMPACT POLYVINYL HALIDE COMPOSITIONS

[75] Inventors: Riley E. Asay; David Mok, both of Austin, Tex.

[73] Assignee: Vista Chemical Company, Houston, Tex.

[21] Appl. No.: 866,328

[22] Filed: Apr. 9, 1992

[51] Int. Cl.$^5$ .................. C08L 27/06; C08L 33/04; C08L 33/20; C08L 55/02
[52] U.S. Cl. .......................... 525/84; 525/85; 525/232; 525/238; 525/239; 525/241
[58] Field of Search ............... 525/84, 239, 241, 238, 525/232, 85

[56] References Cited

U.S. PATENT DOCUMENTS 4,657,976  4/1987  Ott et al. ............................ 525/239

Primary Examiner—James J. Seidleck
Assistant Examiner—W. R. H. Clark
Attorney, Agent, or Firm—Browning, Bushman, Anderson & Brookhart

[57] ABSTRACT

A high impact polyvinyl halide composition containing a polyvinyl halide polymer, a high rubber content copolymer of acrylonitrile, bitadiene and styrene, a copolymer of α methyl styrene and acrylonitrile, and a copolymer of ethylene and vinyl acetate.

4 Claims, No Drawings

HIGH IMPACT POLYVINYL HALIDE COMPOSITIONS

BACKGROUND OF THE INVENTION

1. Field of the invention

The present invention relates to high impact polyvinyl halide compositions and, more particularly, to such polyvinyl halide compositions containing high rubber content acrylonitrile/butadiene/styrene (ABS) copolymers.

2. Background of the Invention

Polyvinyl halide compositions, particularly blends of polyvinyl halides such as polyvinyl chloride (PVC) and styrene based polymers find widespread use in numerous applications. One problem associated with blends of PVC/styrene based polymers is that the presence of the styrene polymers imparts a "glassy" nature to the blends thereby lowering their impact properties. Although impact resistance can be attained by lowering the level of the styrene polymers in the blend, this impacts deleteriously on the heat distortion properties of the blend.

Commercial blends of PVC-containing, styrene based polymers are known. For example, a blend of 45 to 55 percent by weight polyvinyl chloride, 5 to 10 percent by weight of a copolymer of acrylonitrile, butadiene and styrene, 15 to 25 percent by weight of a copolymer of α-methyl styrene and acrylonitrile, 1 to 10 percent by weight of a copolymer of styrene and acrylonitrile, and 1 to 5 percent by weight of a copolymer of ethylene and vinyl acetate is a commercially available, prior art product. The aforementioned prior art blends, while exhibiting good resistance to heat distortion, suffer from reduced Izod impact strength, particularly at low temperatures.

SUMMARY OF THE INVENTION

It is therefore an object of the present invention to provide an improved blend of polyvinyl halide polymers and styrene based polymers which exhibit excellent resistance to heat distortion and improved impact at both room temperature and low temperatures, e.g. about −40° C.

Another object of the present invention is to provide an improved polyvinyl halide composition containing a styrene-based polymer and a copolymer of acrylonitrile, butadiene and stryene which has a high rubber content.

The above and another objects of the present invention will become apparent from the description given here and the appended claims.

The present invention provides a polyvinyl halide composition comprising from about 45 to about 75 percent by weight of a polyvinyl halide polymer, particularly polyvinyl chloride, from about 12 to about 50 percent by weight of a copolymer of acrylonitrile, butadiene and styrene containing at least about 7 percent by weight acrylonitrile and at least about 60 percent by weight butadiene, from about 5 to about 30 percent by weight of a copolymer of α-methyl styrene and acrylonitrile containing from about 30 to 35 percent by weight of acrylonitrile and from about 2 to about 4 percent by weight of a copolymer of ethylene and vinyl acetate, the vinyl acetate content being about 45 percent.

DESCRIPTION OF THE PREFERRED EMBODIMENTS

The polymeric blends of the present invention are comprised of four main, polymer species, (1) a polyvinyl halide containing at least about 40 percent by weight halogen, (2) a copolymer of acrylonitrile, butadiene and styrene (ABS) which contains at least about 7 percent by weight acrylonitrile and at least about 60 percent by weight butadiene, (3) a copolymer of α-methyl styrene and acrylonitrile (α-MS/AN) containing from about 30 to about 35 percent by weight of acrylonitrile, and (4) a copolymer of ethylene and vinyl acetate (EVA) containing about 45 by weight vinyl acetate.

The polyvinyl halide polymer is preferably polyvinyl chloride and, more preferably a homopolymer of vinyl chloride. Copolymers of vinyl halide such as vinyl chloride and at least one other copolymerizable monomer can also be employed. The polyvinyl halide polymer will contain at least about 40 percent by weight halogen and will be present in the compositions of the present invention in an amount of from about 45 to about 75 percent by weight.

The ABS polymers used in the composition of the present invention are referred to as "high rubber" ABS resins in the sense that they are mainly made up of butadiene. More specifically, the ABS resins employed will contain at least about 7 percent by weight acrylonitrile and at least about 60 percent by weight butadiene. The ABS resins or polymers will be employed in the compositions of the present invention in an amount of from about 12 to about 50 percent by weight, more generally from about 12 to about 25 percent by weight.

The α-MS/AN copolymers employed in the compositions of the present invention are those which contain from about 30 to about 35 percent by weight of acrylonitrile, more particularly from about 31 to about 33 percent by weight of acrylonitrile. The α-MS/AN copolymers will be present in the compositions of the present invention in an amount of from about 5 to about 35 percent by weight, more generally from about 5 to about 30 percent by weight.

The last major component of the compositions of the present invention is a copolymer of ethylene and vinyl acetate containing about 45 percent by weight vinyl acetate. The EVA copolymer will be present in the compositions of the present invention in an amount of from about 2 to about 4 percent by weight.

In addition to the four main polymeric components described above, the compositions of the present invention can also contain, with advantage, styrene/acrylonitrile (SAN) copolymers. The SAN copolymers used in the compositions of the present invention will generally contain from about 30 to about 35 percent by weight of acrylonitrile, preferably from about 31 to abut 33 percent by weight of acrylonitrile. When the SAN polymers are used in the compositions of present invention, they will be present in an amount of up to about 10 percent by weight.

In addition to the polymeric components noted above, the compositions of the present invention will contain the usual ingredients incorporated in such polymeric compositions for stabilization purposes. Thus, the compositions can contain thermal stabilizers, antioxidants, acid scavengers, flame retardants, lubricants, placticizers, etc.

A surprising feature of the compositions of the present invention is the extent of increase observed in the Izod impact strength, both at room temperature and more surprisingly at low temperatures of about −40° C., as compared with a prior art, commercially available composition. This large increase in impact strength at such low temperatures, while maintaining resistance to heat distortion, is unexpected.

To more fully illustrate the present invention, the following non-limiting example is presented. In the example which follows, the amounts of the various components are in weight percent unless otherwise indicated.

EXAMPLE

A series of blends polyvinyl chloride/styrene based polymers according to the present inventions were prepared. Additionally, formulations containing higher amounts of styrene based polymers were also prepared for comparison purposes. The formulations of the present invention were also compared with a prior art, commercially available formulation. Table 1 below shows the compositions of the various formulations:

TABLE 1

| Ingredients | | Formulation PA-1 | PA-2 | A | B | C | D | E |
|---|---|---|---|---|---|---|---|---|
| TOTAL PVC RESIN[1] | | (54) | (42) | (50) | (50) | (61) | (30) | (16) |
| ABS RESIN | BLX-[2] 338 | 9 | 13 | 12.5 | 20 | 23 | 15 | 18 |
| α-MS/AN RESIN | DNA-[3] 68 | 21.7 | 35 | 27 | 14.5 | 5 | 0 | 0 |
| | BLX-[4] 586 | 0 | 0 | 0 | 0 | 0 | 43 | 50 |
| SAN RESIN | CN-[5] 25 | 6 | 0 | 0 | 5 | 0 | 0 | 0 |
| EVA RESIN | L450[6] N | 2.5 | 2.25 | 3 | 3 | 3 | 2.5 | 2.5 |
| Sn STABILIZERS | ATLS[7] 777 | 1.8 | 1.5 | 2 | 2 | 2.5 | 1.5 | 1.5 |
| | T-35[8] | 0.8 | 1.75 | 1 | 1 | 1 | 1.5 | 1.5 |
| ANTIOXIDANTS | 1076[9] | 0.3 | 0.6 | 0.6 | 0.6 | 0.6 | 0.5 | 0.6 |
| | U626[10] | 0 | 0 | 0 | 0 | 0 | 0.5 | 0.6 |
| ACID SCAV. | DHT-[11] 4A2 | 0.6 | 0.6 | 0.6 | 0.6 | 0.6 | 0 | 0 |
| FLAME RETARDANTS | Sb2O3 | 0 | 0 | 0 | 0 | 0 | 2 | 6 |
| LUBRICANTS | CaSt[12] | 1 | 1 | 1 | 1 | 1 | 1 | 1 |
| | G-TS[13] | 2 | 2 | 2 | 2 | 2 | 2 | 2 |
| | AC-[14] 316A | 0.3 | 0.3 | 0.3 | 0.3 | 0.3 | 0.3 | 0.3 |

[1] Polyvinyl chloride (homopolymer) marketed by Vista Chemical Co.
[2] Acrylonitrile/butadiene/styrene copolymer marketed as BLENDEX 338 by G.E. Specialty Chemicals and containing about 9 percent by weight acrylonitrile, about 65 percent by weight butadiene and about 25 percent by weight styrene.
[3] An α-methyl styrene/acrylonitrile copolymer marketed as DNA-68 by Monsanto Chemical Company and containing a minimum of 31 and a maximum of 33 percent by weight acrylonitrile.
[4] An α-methyl styrene/acrylonitrile copolymer marketed under the name BLENDEX 586 by G.E. Specialty Chemicals and containing 25–30 percent by weight acrylonitrile.
[5] A styrene/acrylonitrile copolymer marketed as CN-25 by Monsanto Chemical Company and containing a minimum of about 30 percent by weight and a maximum of about 32 percent by weight acrylonitrile.
[6] Ethylene/vinyl acetate copolymer marketed as BAYMODE L450N by Mobay and containing 45 percent by weight vinyl acetate.
[7] Dibutyltin bis-isooctylthioglyolate marketed by Ciba Geigy.
[8] Alkyltin mercapto ester marketed by AtaChem North America.
[9] Octadecyl 3, 5-di-tert-butyl-4-hydroxyhydrocinnamate marketed as IRGANOX 1076 by Ciba Geigy.
[10] Bis-(2,4-di-tert-butylphenyl) pentaerythritol marketed as Ultranox 626 by Specialty Chemicals.
[11] Magnesium aluminum hydroxycarbonate marketed as DHT-4A2 by Kyowa Chemical Industry Co., Ltd.
[12] Calcium stearate.
[13] Fatty acid ester blend marketed as GLYCOLUBE TS by Lonza.
[14] Oxidized polyethylene marketed as AC-316A by Allied Chemical.
PA-1 = Prior art, commercially available formulation
PA-2 = Prior art, commercially available formulation Table 2 below shows the results of physical property measurements on the formulations shown in Table 1.

TABLE 2

| | PA-1 | PA-2 | A | B | C | D | E |
|---|---|---|---|---|---|---|---|
| ⅛″ IZOD @ RT[1] | 8 | 13.5 | 16.5 | 16 | 13.6 | 8 | 3 |
| ⅛″ IZOD @ 40° C.[2] | 0.5 | 1.5 | 3.8 | 13. | 11.3 | 1.3 | 1.5 |
| ¼″ HDT[3] (Unannealed) | 73 | 78 | 71 | 70 | 67 | 83 | 93 |
| ¼″ HDT[4] (Annealed) | 76 | 80 | 76 | 73 | 72 | 87 | 93 |

[1] ⅛″ notched Izod Impact at room temperature 73° F. (23° C.) by ASTM D256.
[2] ⅛″ notched Izod Impact at −40° F. by ASTM D256.
[3] ASTM D648 @ 264 psi.
[4] ASTM D648 @ 264 psi.

As can be seen from the data in Tables 1 and 2, the compositions of the present invention show dramatic, unexpected increase, both in room temperature and low temperature Izod impact strength as compared with the prior art formulation (PA-1). In particular, as can be seen from the data, when the concentration of ABS resin containing at least 7 percent by weight acrylonitrile and at least about 60 percent by weight butadiene is increased to greater than about 12 percent, there is a dramatic and unexpected rise in low temperature Izod strength. At the same time, the heat distortion properties remain essentially the same as that of the prior art product. As can also be seen from the data, if the amount of PVC is lowered below about 45 percent, even though the content of the ABS resin remains above 12 percent, there is a marked increase in susceptibility to heat distortion as well as a significant drop in room temperature Izod strength.

The foregoing disclosure and description of the invention is illustrative and explanatory thereof, and various changes in the composition may be made within the scope of the appended claims without departing from the spirit of the invention.

What is claimed is:

1. A polyvinyl halide composition comprising:

from about 45 to about 75 percent by weight of a polyvinyl halide polymer:

from about 12 to about 50 percent by weight of copolymer of acrylonitrile, butadiene and styrene containing at least about 7 percent weight by acrylonitrile and at least about 60 percent by weight butadiene:

from about 5 to about 30 percent by weight of a copolymer of α-methyl styrene and acrylonitrile containing from about 30 to about 35 percent by weight acrylonitrile: and from about 2 to about 4 percent by weight of a copolymer of ethylene and vinyl acetate containing about 45 percent by weight vinyl acetate.

2. The composition of the claim 1 wherein said polyvinyl halide polymer comprises polyvinyl chloride.

3. The composition of claim 1 wherein said copolymer of acrylonitrile, butadiene and styrene is present in an amount of from about 15 to about 25 percent by weight.

4. The composition of claim 1 including an additional copolymer of styrene and acrylonitrile present in an amount of up to about 10 percent by weight, said additional polymer containing from about 31 to about 33 percent by weight of acrylonitrile.

* * * * *